(12) United States Patent
Hu et al.

(10) Patent No.: US 12,217,448 B2
(45) Date of Patent: Feb. 4, 2025

(54) CAMERA POSE INFORMATION DETECTION METHOD AND APPARATUS, AND CORRESPONDING INTELLIGENT DRIVING DEVICE

(71) Applicant: CiDi Inc., Hunan (CN)

(72) Inventors: Rongdong Hu, Hunan (CN); Mingxi Tang, Hunan (CN); Linjiang Xie, Hunan (CN); Qing Peng, Hunan (CN)

(73) Assignee: CiDi Inc., Hunan (CN)

( * ) Notice: Subject to any disclaimer, the term of this patent is extended or adjusted under 35 U.S.C. 154(b) by 538 days.

(21) Appl. No.: 17/610,514

(22) PCT Filed: May 12, 2020

(86) PCT No.: PCT/CN2020/089765
§ 371 (c)(1),
(2) Date: Nov. 11, 2021

(87) PCT Pub. No.: WO2020/228694
PCT Pub. Date: Nov. 19, 2020

(65) Prior Publication Data
US 2022/0215573 A1 Jul. 7, 2022

(30) Foreign Application Priority Data
May 13, 2019 (CN) .......................... 201910394067.0

(51) Int. Cl.
G06T 7/70 (2017.01)
G06T 7/50 (2017.01)
G06V 20/56 (2022.01)

(52) U.S. Cl.
CPC .................. G06T 7/70 (2017.01); G06T 7/50 (2017.01); G06V 20/588 (2022.01); G06T 2207/30252 (2013.01)

(58) Field of Classification Search
None
See application file for complete search history.

(56) References Cited

U.S. PATENT DOCUMENTS

| 11,875,537 B2* | 1/2024 | White ....................... G06T 7/30 |
| 2009/0268948 A1* | 10/2009 | Zhang .................. G06V 20/588 |
| | | 382/104 |
| 2010/0295948 A1* | 11/2010 | Xie .......................... G06T 7/80 |
| | | 348/E17.002 |

(Continued)

FOREIGN PATENT DOCUMENTS

| CN | 103686143 A | 3/2014 |
| CN | 103745452 A | 4/2014 |

(Continued)

OTHER PUBLICATIONS

International Search Report from International Application No. PCT/CN2020/089765 mailed Aug. 11, 2020.

*Primary Examiner* — Delomia L Gilliard
(74) *Attorney, Agent, or Firm* — Dorsey & Whitney LLP (57) ABSTRACT

A camera pose information detection method, includes collecting a plurality of images by means of a multi-lens camera, and determining a road surface region image based on the plurality of images; and projecting points in the road surface region image onto a camera coordinate system, so as to obtain camera pose information.

15 Claims, 4 Drawing Sheets

(56) References Cited

U.S. PATENT DOCUMENTS

2012/0281881 A1* 11/2012 Walter ................. B60W 40/114
    382/104
2014/0169636 A1* 6/2014 Hara ........................ G06T 7/73
    382/106
2015/0323648 A1* 11/2015 Haglund .............. G01C 21/005
    701/4

FOREIGN PATENT DOCUMENTS

| | | |
|---|---|---|
| CN | 105164726 A | 12/2015 |
| CN | 105469076 A | 4/2016 |
| CN | 105469386 A | 4/2016 |
| CN | 108022264 A | 5/2018 |
| CN | 109903346 A | 6/2019 |
| JP | 2002008012 A | 1/2002 |

* cited by examiner

CAMERA POSE INFORMATION DETECTION METHOD AND APPARATUS, AND CORRESPONDING INTELLIGENT DRIVING DEVICE

CROSS REFERENCE TO RELATED APPLICATIONS

This application is a U.S. national stage of PCT Patent Application No. PCT/CN2020/089765, entitled "CAMERA POSE INFORMATION DETECTION METHOD AND APPARATUS, AND CORRESPONDING INTELLIGENT DRIVING DEVICE", filed on May 12, 2020; which claims priority to Chinese application No. 2019103940670, entitled "CAMERA POSE DETECTION METHOD, APPARATUS, DEVICE AND STORAGE MEDIUM", filed on May 13, 2019, the contents of each of which are incorporated by reference herein in their entirety.

TECHNICAL FIELD

The present disclosure relates to the field of intelligent driving, and in particular, to a camera pose information detection method and apparatus, and a corresponding intelligent driving device.

BACKGROUND

Detection of a camera pose angle is of great significance in unmanned driving, intelligent robotics and other fields. In a conventional monocular-vision-based camera pose angle calculation method, distances of a plurality of particular positions are generally required to be acquired by using a ranging sensor, and a camera pose angle is finally obtained by solving a Perspective-n-Point (PNP) algorithm in combination with coordinates of the particular positions in an image coordinate system. Therefore, solution is required prior to use of a camera in the method, and the camera pose angle cannot be calculated in real time.

SUMMARY

In view of the technical problems in the related art, the present disclosure proposes a camera pose information detection method, including collecting a plurality of images by means of a multi-lens camera, and determining a road surface region image based on the plurality of images; and projecting points in the road surface region image onto a coordinate plane of a camera coordinate system, so as to obtain at least a pitch angle and/or a roll angle in camera pose information.

Particularly, the method further includes acquiring points on a lane line, and projecting the points on the lane line onto the coordinate plane of the camera coordinate system, so as to obtain at least a yaw angle in the camera pose information.

Particularly, the determining a road surface region image based on the plurality of images includes: selecting one of the plurality of images as an original image, and generating a depth map of the original image in combination with other images in the plurality of images; traversing the original image by using a search box, and obtaining a plurality of subimages corresponding to various search boxes; and calculating road surface confidences of the subimages, and selecting the subimage with the maximum road surface confidence as the road surface region image.

Particularly, the determining a road surface region image based on the plurality of images further includes: filtering the plurality of images based on a preset depth threshold, and retaining only the subimages with center point depth values less than the depth threshold; and calculating road surface confidences for the retained subimages, and taking the subimage with the highest confidence as the road surface region image.

Particularly, the calculating road surface confidences of the subimages includes: calculating information entropies of the subimages by using the following formula, and taking reciprocals of the information entropies as the road surface confidences, $$E = -\sum_{g=0}^{2^m-1} p(g)\log_2(p(g))$$

where E is an image information entropy, g represents a grayscale value, P(g) is a probability of appearance of a current grayscale value g in the subimage, and m is a natural number greater than or equal to 1.

Particularly, the traversing the original image by using a search box includes: determining dimensions of the search box according to the following formulas: a width of the search box being $W_s = \lceil W/(n*\delta) \rceil$, a height of the search box being $H_s = \lceil H/n \rceil$; where W is a width of the original image, H is a height of the original image, δ is an aspect ratio W/H of the original image, ⌈ ⌉ is a rounding-up symbol, n is a search ratio parameter, and n is a natural number.

Particularly, the depth threshold ranges at least from 15 m to 25 m.

Particularly, the projecting points in the road surface region image onto a coordinate plane of a camera coordinate system to obtain camera pose information projecting the points on the lane line onto the coordinate plane of the camera coordinate system to obtain the camera pose information includes: fitting the projected points in the coordinate plane, and obtaining the camera pose information based on an angle formed by a fitted line and a coordinate axis of the coordinate plane.

The present disclosure further provides a camera pose detection apparatus, including an image acquisition module configured to obtain a plurality of images; a road surface region determination module configured to determine a road surface region image based on the plurality of images; and a pose determination module configured to determine at least a pitch angle and/or a roll angle in camera pose information based on projections of points in the road surface region image onto a coordinate plane of a camera coordinate system.

Particularly, the image acquisition module is further configured to acquire pixel points on a lane line; and the pose determination module is further configured to determine at least a yaw angle in the camera pose information based on projections of the pixel points on the lane line onto the coordinate plane of the camera coordinate system.

Particularly, the image acquisition module is configured to select one of the plurality of images as an original image, and generate a depth map of the original image in combination with other images in the plurality of images; wherein the road surface region determination module includes: a search and traversal submodule configured to traverse the original image by using a search box, and obtain a plurality of subimages corresponding to various search boxes; and a road surface confidence filtering submodule configured to calculate road surface confidences of the subimages, and select the subimage with the maximum road surface confidence as the road surface region image.

Particularly, the road surface region determination module further includes: a depth value filtering submodule configured to filter the plurality of images based on a preset depth threshold, and retain only the subimages with center point depth values less than the depth threshold; and the road surface confidence filtering submodule configured to calculate road surface confidences of the retained subimages, and select the subimage with the maximum road surface confidence as the road surface region image.

Particularly, the road surface confidence filtering submodule is configured to calculate information entropies of the subimages by using the following formula, and take reciprocals of the information entropies as the road surface confidences, $$E = -\sum_{g=0}^{2^m-1} p(g)\log_2(p(g))$$

where E is an image information entropy, g represents a grayscale value, P(g) is a probability of appearance of a current grayscale value g in the subimage, and m is a natural number greater than 1.

Particularly, the search and traversal submodule is configured to determine dimensions of the search box according to the following formulas: a width of the search box being $W_s = \lceil W/(n*\delta) \rceil$, a height of the search box being $H_s = \lceil H/n \rceil$; where W is a width of the original image, H is a height of the original image, δ is an aspect ratio W/H of the original image, $\lceil\ \rceil$ is a rounding-up symbol, n is a search ratio parameter, and n is a natural number.

Particularly, the depth threshold ranges at least from 15 m to 25 m.

Particularly, the pose determination module is configured to fit the points in the road surface region image or the points on the lane line, which are projected onto the coordinate plane of the camera coordinate system, in the corresponding coordinate plane, and obtain the camera pose information based on an angle formed by a fitted line and a coordinate axis of the coordinate plane.

The present disclosure further provides an intelligent driving device, including a processor, and a memory and a network interface that are coupled to the processor; a vehicle sensor unit including a multi-lens camera configured to acquire a plurality of images; wherein the processor is configured to perform the method described in any of the foregoing.

The present disclosure provides a solution to relative pose offset between the camera and a body of the intelligent driving device. Pose information of the camera coordinate system is obtained by using a road surface as a reference, so as to correct the camera coordinate system to obtain a vehicle coordinate system. This prevents negative impact of the offset of the camera relative to the body on automatic driving and prevents safety risks.

BRIEF DESCRIPTION OF THE DRAWINGS

Implementations of the present disclosure are described in further detail below with reference to the accompanying drawings. In the drawings.

DETAILED DESCRIPTION OF THE EMBODIMENTS

In order to make the objectives, technical solutions and advantages of embodiments of the present disclosure clearer, the technical solutions in the embodiments of the present disclosure will be described clearly and completely below with reference to the accompanying drawings in the embodiments of the present disclosure. Obviously, the described embodiments are merely some of rather than all of the embodiments of the present disclosure. Based on the embodiments in the present disclosure, all other embodiments obtained by those of ordinary skill in the art without creative efforts all fall within the protection scope of the present disclosure.

In the following detailed description, reference may be made to each drawing of the specification used as a part of the present disclosure to illustrate specific embodiments of the present disclosure. In the drawings, similar reference signs describe substantially similar components in different schemas. Specific embodiments in the present disclosure are fully described in detail as below, so that those with ordinary knowledge and technology in the art can implement the technical solutions of the present disclosure.

In some actual application scenarios, undesired changes may occur in camera poses due to factors such as jitter. For example, in an unmanned driving scene, due to road bumps and other reasons, a camera pose angle may change relative to a body pose angle (or an initial pose angle of a camera). That is, in this case, the camera coordinate system is not equivalent to the vehicle coordinate system. If an automatic driving instruction is generated based on an image captured by the camera without correction, the instruction may be inconsistent with an actual situation of a vehicle, thereby causing major safety risks.

In order to solve the problem that a camera pose changes relative to a vehicle pose, the present disclosure proposes the following solution. Ideally, a line of sight of the camera is parallel to road surfaces near the vehicle. However, when the camera pose angle may change relative to the body pose angle, the line of sight of the camera (an entrance optical axis of the camera) is no longer parallel to the road surfaces near the vehicle. Therefore, in the solution according to the present disclosure, angles between the line of sight of the camera and the roads surface near the vehicle are obtained by finding projections of the road surfaces near the vehicle onto the camera coordinate system, and then image data obtained by the camera is corrected by using the angles to obtain a correct vehicle coordinate system, so as to overcome adverse effects caused by deflection of the camera relative to the body.

Figure 1:
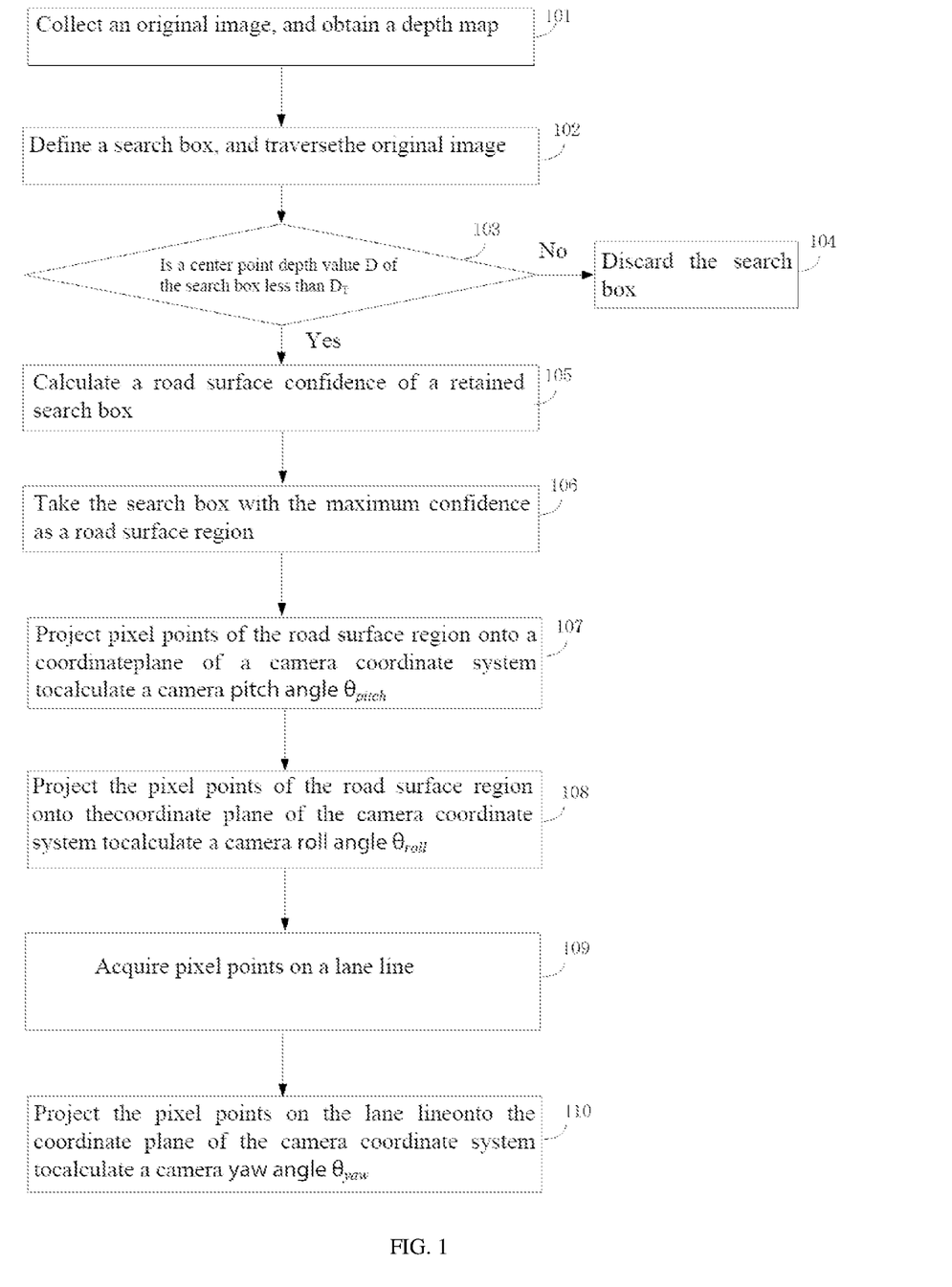
FIG. 1 is a schematic flowchart of a camera pose detection method according to an embodiment of the present disclosure.

FIG. 1 is a schematic flowchart of a camera pose detection method according to an embodiment of the present disclosure.

In step 101, an original image is collected, and a depth map corresponding thereto is obtained.

The so-called depth map refers to an image taking distances (depths) from a camera to points in a scenario as pixel values, which can directly reflect a geometric shape of a visible surface of a scenery. A dual-lens or multi-lens stereo camera may take pictures of a same object respectively to obtain two or more images. One of the images may be taken as the original image, and correction and matching are performed using other images, so as to obtain the depth map.

In step 102, a search box is defined, and the original image is traversed by using the search box.

In some embodiments, dimensions of the search box may be pre-specified or determined according to parameters of the original image. Assuming that the original image has a width W, a height H and an aspect ratio $\delta = W/H$, the search box may have a width $W_s = \lceil W/(n*\delta) \rceil$ and a height $H_s = \lceil H/n \rceil$, where $\lceil\ \rceil$ is a rounding-up symbol, and n is a search ratio parameter, which may range from 5 to 8 or be other natural numbers.

According to an embodiment, the entire original image may be traversed from, for example, an upper left corner (or any position) of the original image with a traversal step such as $W_s/2$ in a width direction of the original image or a traversal step such as $H_s/2$ in a height direction of the original image. Certainly, the traversal step may also be set to other values as required.

According to an embodiment, after traversal, a plurality of subimages with depth values having dimensions corresponding to the dimensions of the search box may be generated.

In step 103, it is determined whether a center point depth value D of each subimage is less than a preset depth threshold $D_T$.

If a center point depth value D of a current subimage is less than the preset depth threshold $D_T$, the subimage is retained and step 105 is performed. Otherwise, step 104 is performed.

According to an embodiment, the depth threshold $D_T$ may be 15 m<$D_T$<25 m. In this way, it is considered that a road surface region near a vehicle is parallel to a traveling direction of the vehicle, and "near" may be defined as a distance less than $D_T$ from the vehicle. Therefore, in order to obtain a road surface near the vehicle, center point depth values D of the subimages are required to be filtered first, and only regions meeting the requirement of the distance may be the road surface near the vehicle.

Optionally, according to an embodiment, operations of steps 102 and 103 may be performing, after a subimage corresponding to each search box is acquired, filtering by using a center point depth value thereof, skipping the search box if the center point depth value is greater than $D_T$, and acquiring a subimage corresponding to next search box until the entire original image has been traversed. According to another embodiment, all the subimages may be obtained and then filtered by using the depth threshold.

In step 104, the subimages with center point depth values greater than or equal to $D_T$ are discarded.

In step 105, road surface confidences are calculated for the retained subimages.

The so-called road surface confidence is an index to determine which subimage may be used as the road surface region image. Measurement indexes may vary according to different embodiments. According to an embodiment of the present disclosure, the road surface confidences of the subimages may be determined through image information entropies.

Specifically, the corresponding image information entropy may be calculated according to a grayscale value of a pixel point of each retained subimage.

In some embodiments, the image information entropy of the subimage may be calculated by using the following formula (1):

$$E = -\sum_{g=0}^{2^m-1} p(g)\log_2(p(g)) \quad (1)$$

where E is an image information entropy, P(g) may be a probability of appearance of a grayscale value g in a region corresponding to the search box, g may represent one of a plurality of grayscale values, for example, a number of g may be $2^n$ in this embodiment, and m is a natural number greater than or equal to 1.

According to an embodiment, the road surface confidence of the subimage may be calculated according to the image information entropy of the subimage. For example, the road surface confidence of the corresponding region may be determined by using the following formula (2):

$$\sigma = 1/E \quad (2)$$

where σ is the road surface confidence.

In step 106, the subimage with the maximum road surface confidence is taken as a road surface region image.

As can be seen from the above, the higher the road surface confidence of the region is, the smaller the information entropy is, and the smaller the information entropy is, the more uniform the color or grayscale of the region is. Theoretically, the color or grayscale of the road surface region should be basically the same or vary very little. Therefore, it may be considered that the region with the minimum information entropy is the region with the highest road surface confidence, and thus may also be regarded as the road surface region.

According to different embodiments, depth values may not be filtered, the road surface confidences of the subimages are directly calculated, and the following operation is performed. However, this may be less accurate than the above method, because if there is a scenery with a relatively small information entropy in the distance, the determination of the road surface region may be affected to some extent.

After image data of a road surface region near the vehicle is obtained, points in the road surface region image may be projected onto a coordinate plane of a camera coordinate system, so as to obtain a yaw angle of the camera relative to the road surface and obtain a vehicle coordinate system.

There are many possible methods to perform projection and calculate the camera pose angle. For example, three pose angles of the camera may be obtained respectively by finding a projection of the road surface region near the vehicle under the camera coordinate system, and three coordinate axes of the camera coordinate system are corrected according to the three pose angles, to finally obtain the vehicle coordinate system. Alternatively, a pose angle of the camera may also be first obtained, an intermediate coordinate system is then obtained, next pose angle is obtained under the coordinate system, and the vehicle coordinate system is finally obtained by analogy.

Only one embodiment is proposed below as an illustration. All methods of obtaining camera pose angles by adjusting or changing the order of obtaining various pose angles on the basis of the embodiment fall within the protection scope of the present disclosure.

In step 107, all pixel points in the road surface region image are projected onto a YOZ plane of a camera coordinate system, and a camera pitch angle $\theta_{pitch}$ is calculated.

It is assumed that in the camera coordinate system, Z axis represents an axis parallel to a line of sight of the camera, and X axis and Y axis together form a plane perpendicular to the line of sight of the camera.

According to actual observation, it is more likely that the camera deviates in, for example, the YOZ plane or the camera may change a pitch pose, and the deviation may be greater. Therefore, projections of points in the road surface region image onto the YOZ plane of the camera coordinate system may be first calculated.

In some embodiments, it is assumed that coordinates of the pixel points in the road surface region image under the camera coordinate system are $(X_i, Y_i, Z_i)$, where i represents any point in the road surface region image, and a value range of i is related to the dimensions of the search box and resolution of the camera. After the coordinates of the pixel points of the road surface region image are all projected onto the YOZ plane of the camera coordinate system, the coordinates are changed into $(Z_i, Y_i)$.

According to an embodiment, all points in the road surface region projected onto the YOZ plane may be linearly fitted by least square method, to obtain a linear equation of a fitted line:

$$Y = a_1 * Z + b_1 \quad (3)$$

An angle between the fitted line and the Z axis may be taken as the pitch angle $\theta_{pitch}$ of the camera, and a calculation formula is as follows:

$$\theta_{pitch} = \arctan(-a_1) \quad (4)$$

In other cases, if the road surface near the vehicle is not flat, a curve equation may be obtained by fitting. Such changes do not require creative efforts, and thus still fall within the protection scope of the present disclosure.

In step 108, the pixel points in the road surface region image are projected onto the coordinate plane of the camera coordinate system to calculate a roll angle $\theta_{roll}$ of the camera. The roll angle may be calculated in many manners. Pixels of the road surface region may be projected onto an XOY plane in an uncorrected camera coordinate system, or projected onto a plane in a first intermediate camera coordinate system X'Y'Z' corrected by using the pitch angle $\theta_{pitch}$.

Figure 3:
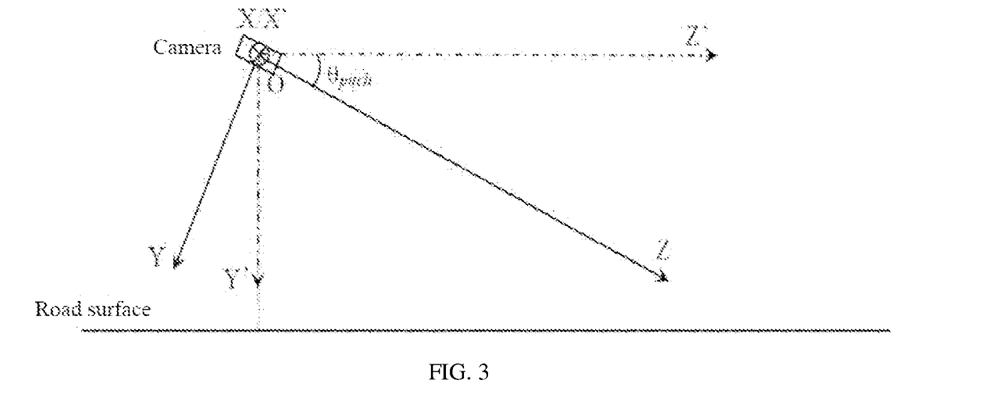
FIG. 3 is a schematic diagram of correction of a camera in a pitch direction according to an embodiment of the present disclosure.

The second manner is introduced below.

FIG. 3 is a schematic diagram of correction of a camera in a pitch direction according to an embodiment of the present disclosure. In the case of downward offset of the camera, the camera coordinate system may be rotated by $\theta_{pitch}$ counterclockwise to obtain the first intermediate camera coordinate system, as shown in FIG. 3. Certainly, in the case of upward offset of the camera, the camera coordinate system may be rotated by $\theta_{pitch}$ clockwise to obtain the first intermediate camera coordinate system.

Coordinates of the points of the road surface region under the camera coordinate system may be expressed as $(X_i, Y_i, Z_i)$, and after the correction by using the pitch angle $\theta_{pitch}$ (assuming that downward offset occurs), coordinates of the points in the road surface region image under the first intermediate camera coordinate system may be expressed as $(X_i', Y_i', Z_i')$. Conversion formulas may be as follows:

$$X_i' = X_i \quad (5)$$

$$Y_i' = \cos(\theta_{pitch}) * Y_i + \sin(\theta_{pitch}) * Z_i \quad (6)$$

$$Z_i' = \cos(\theta_{pitch}) * Z_i - \sin(\theta_{pitch}) * Y_i \quad (7)$$

According to an embodiment, all the pixel points in the road surface region image may be projected onto an X'OY' plane of the first intermediate camera coordinate system, coordinates after projection are $(X_i', Y_i')$, and all the projected points are linearly fitted by, for example, least square method to obtain a linear equation of a line:

$$Y' = a_2 * X' + b_2 \quad (8)$$

A calculation formula for the roll angle of the camera is as follows:

$$\theta_{roll} = \arctan(-a_2) \quad (9)$$

In step 109, pixel points on a lane line are acquired. According to some embodiments, points on the lane line may be a part of the road surface region image. In this case, data of the pixel points on the lane line may be extracted from data of the road surface region image during the obtaining of a yaw angle by using data of the pixel points on the lane line. According to other embodiments, the points on the lane line may not be in the road surface region image, which may be obtained through, for example, GPS in coordination with data pre-stored in a database. In conclusion, the data of the pixel points on the lane line may be obtained by any method according to different embodiments, which is not limited herein.

It is more suitable to determine the yaw angle by using a projection of the lane line. Therefore, in step 110, the pixel points on the lane line are projected onto the coordinate plane of the camera coordinate system to calculate, for example, a camera yaw angle $\theta_{yaw}$.

According to an embodiment, the points on the lane line may be projected onto the XOZ plane of the camera coordinate system and fitted to obtain the yaw angle $\theta_{yaw}$. According to another embodiment, the points on the lane line may also be projected onto a coordinate plane of an intermediate camera coordinate system. The process is similar to the above manner of obtaining the roll angle, and is not described in detail herein.

Coordinates of the pixel points on the lane line under the camera coordinate system may be expressed as $(X_i^{road}, Y_i^{road}, Z_i^{road})$ and coordinates of the pixel points on the lane line under the first intermediate camera coordinate system corrected by using the pitch angle may be expressed as $(X_i^{road'}, Y_i^{road'}, Z_i^{road'})$. All the pixel points on the lane line are projected onto an X'OZ' plane of the first intermediate camera coordinate system, and coordinates of the projected points are $(X_i^{road'}, Z_i^{road'})$. For example, the projected points may be linearly fitted by least square method to obtain a linear equation:

$$Z_i^{road'} = a_3 * X_i^{road'} + b_3 \quad (10)$$

A calculation formula for the yaw angle of the camera is as follows:

$$\theta_{yaw} = \pi/2 - \arctan(a_3) \quad (11)$$

According to an embodiment, the vehicle coordinate system may be obtained based on the pitch angle, the roll angle and the yaw angle of the camera, and image data captured by the camera is corrected.

In the above introduction, all the projected points in the road surface region image are linearly fitted. It is known to those skilled in the art that, in other cases, such as when the road surface is not completely flat, for example, curve fitting may be performed on the projected points by using other equations. However, in any case, these all fall within the protection scope of the present disclosure.

In the present disclosure, both an original uncorrected camera coordinate system and a partially corrected intermediate camera coordinate system may be referred to as the camera coordinate system.

In the present disclosure, the camera pose information or camera pose angle may include one or more of the pitch angle, the roll angle and the yaw angle.

It is to be understood that, during specific implementation, a processor running the camera pose detection method according to the embodiment of the present disclosure may be located on a terminal side of the camera or on a server side, or the camera pose detection method may be implemented by a terminal side and a server in cooperation, which is not limited in the present disclosure.

Figure 2:
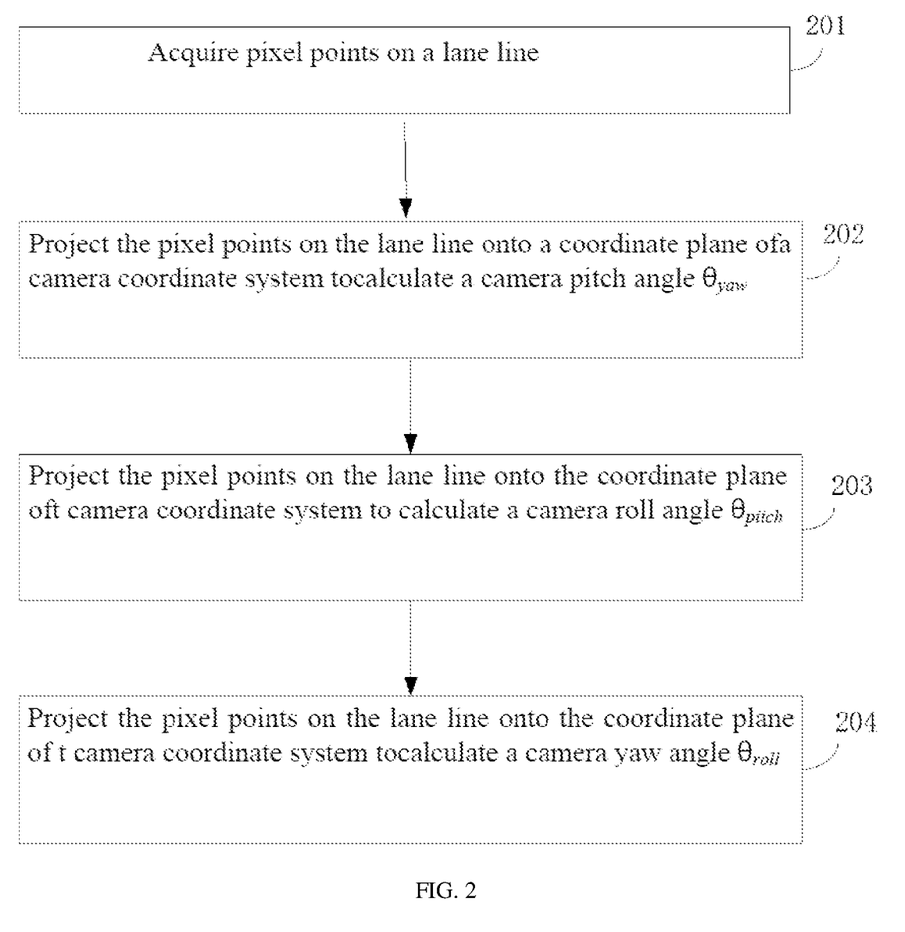
FIG. 2 is a schematic flowchart of a camera pose detection method according to another embodiment of the present disclosure.

FIG. 2 is a schematic flowchart of a camera pose detection method according to another embodiment of the present disclosure.

In step 201, pixel points on a lane line may be acquired.

In step 202, points on the lane line may be projected onto an XOZ plane of a camera coordinate system, the projected points are fitted, and a yaw angle $\theta_{yaw}$ is acquired based on an angle between a fitted line and X and Z axes of the camera coordinate system. According to an embodiment, methods for fitting the projected points on the lane line in the XOZ plane and calculating the yaw angle may be obtained with reference to the embodiment shown in FIG. 1.

Optionally, in step 203, the points on the lane line may be projected onto a YOZ plane of the camera coordinate system, the projected points are fitted, and a pitch angle $\theta_{pitch}$ is acquired based on an angle between a fitted line and Y and Z axes of the camera coordinate system.

Optionally, in step 204, the points on the lane line may be projected onto an XOY plane of the camera coordinate system, the projected points are fitted, and a roll angle $\theta_{roll}$ is acquired based on an angle between a fitted line and X and Y axes of the camera coordinate system.

Figure 4:
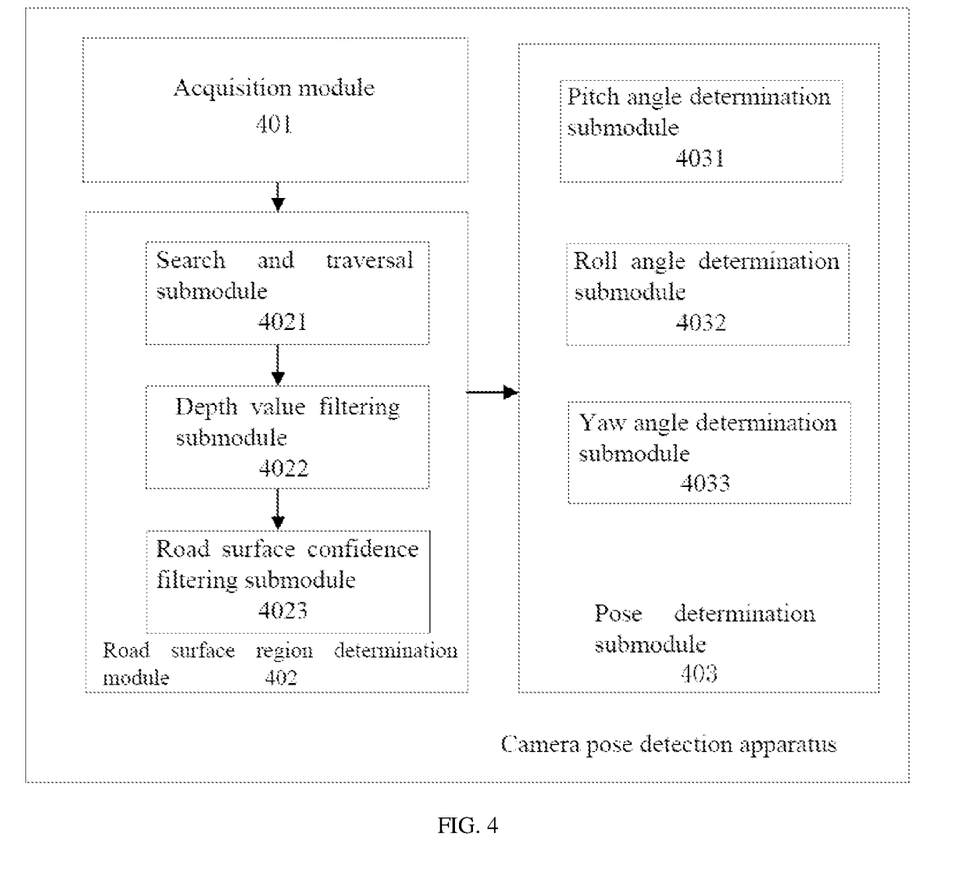
FIG. 4 is an exemplary schematic diagram of a camera pose detection apparatus according to an embodiment of the present disclosure.

FIG. 4 is an exemplary schematic diagram of a camera pose detection apparatus according to an embodiment of the present disclosure. As shown in FIG. 4, the camera pose detection apparatus according to the present disclosure may include an acquisition module 401, a road surface region determination module 402 and a pose determination module 403.

In some embodiments, the acquisition module 401 may be configured to acquire a plurality of images and depth maps corresponding thereto. According to an embodiment, the acquisition module 401 may include a dual-lens stereo camera or a multi-lens stereo camera configured to acquire two or more images, use one of the images as an original image and perform correction and coordination by using other images, so as to obtain the depth maps. According to an embodiment, the acquisition module 401 may also be configured to acquire pixel points on a lane line.

In some embodiments, the road surface region determination module 402 is configured to receive image data from the acquisition module 401, and determine an image of a road surface region near a vehicle therefrom.

According to an embodiment, the road surface region determination module may include a search and traversal submodule 4021, a depth value filtering submodule 4022 and a road surface confidence filtering submodule 4023.

According to an embodiment, the search and traversal submodule 4021 may be configured to determine dimensions of a search box traversing the original image, and traverse the original image by using the search box.

In some embodiments, the dimensions of the search box may be pre-specified or determined according to parameters of the original image. Assuming that the original image has a width W, a height H and an aspect ratio $\delta=W/H$, the search box may have a width $W_s=\lceil W/(n*\delta)\rceil$ and a height $H_s=\lceil H/n\rceil$, where $\lceil\ \rceil$ is a rounding-up symbol, and n is a search ratio parameter, which may range from 5 to 8 or be other natural numbers.

According to an embodiment, the search and traversal submodule 4021 may be configured to start traversal from, for example, an upper left corner (or any position) of the original image, so as to generate a plurality of subimages. The traversal of the entire original image may be started with a traversal step such as $W_s/2$ in a width direction of the original image or a traversal step such as $H_s/2$ in a height direction of the original image. Certainly, the traversal step may also be set to other values as required.

According to an embodiment, the depth value filtering submodule 4022 may be configured to perform filtering according to depth maps of all the subimages obtained by traversal, if a center point depth value D of a current subimage is less than a set depth threshold DT, retain the subimage, and otherwise, discard the subimage.

According to an embodiment, the depth threshold $D_T$ may be 15 m<$D_T$<25 m. In this way, it is considered that a road surface region near a vehicle is parallel to a traveling direction of the vehicle, and "near" may be defined as a distance less than $D_T$ from the vehicle. Therefore, in order to obtain a road surface near the vehicle, center point depth values D of the subimages are required to be filtered first, and only regions meeting the requirement of the distance may be the road surface near the vehicle.

According to an embodiment, the road surface confidence filtering submodule 4023 may be configured to determine road surface confidences of the retained subimages, and take a region with the maximum road surface confidence as a road surface region.

According to an embodiment, the road surface confidence filtering submodule 4023 may be configured to calculate a corresponding image information entropy according to a grayscale value of a pixel point of each retained subimage.

In some embodiments, the image information entropy of the subimage may be calculated by using the following formula (12):

$$E = -\sum_{g=0}^{2^m-1} p(g)\log_2(p(g)) \tag{12}$$

where E is an image information entropy, P(g) may be a probability of appearance of a grayscale value g in a region corresponding to the search box, g may represent one of a plurality of grayscale values, for example, a number of g may be $2^n$ in this embodiment, and m is a natural number greater than or equal to 1.

According to an embodiment, the road surface confidence of the subimage may be calculated according to the image information entropy of the subimage. For example, the road surface confidence of the corresponding region may be determined by using the following formula (13):

$$\sigma=1/E \tag{13}$$

where $\sigma$ is the road surface confidence.

According to an embodiment, the road surface confidence filtering submodule 4023 may be configured to determine road surface confidences of the retained subimages, and take the subimage with the maximum confidence as the road surface region image.

According to different embodiments, the road surface region determination module 402 may also include only the road surface confidence filtering submodule.

According to an embodiment, the pose determination module 403 may include a pitch angle determination submodule 4031, a roll angle determination submodule 4032 and a yaw angle determination submodule 4033.

It is assumed that in the camera coordinate system, Z axis represents an axis parallel to a line of sight of the camera, X axis and Y axis together form a plane perpendicular to the line of sight of the camera, and Y axis is a coordinate axis perpendicular to the plane.

According to an embodiment, the pitch angle determination submodule 4031 may be configured to project all the pixel points of the road surface region image onto a YOZ plane of the camera coordinate system, coordinates after projection being $(Z_i, Y_i)$. All the projected points may be linearly fitted by least square method to obtain a linear equation, so as to obtain a pitch angle $\theta_{pitch}$.

According to an embodiment, the roll angle determination submodule 4032 may be configured to project all the pixel points in the road surface region image onto an XOY plane of the camera coordinate system, coordinates after projection being $(X_i, Y_i)$. The points projected onto the XOY plane may be linearly fitted by least square method to obtain a linear equation, so as to obtain a roll angle $\theta_{roll}$. Certainly, the points in the road surface region image may also be projected onto an X'OY' plane of a first intermediate camera coordinate system, and the projected points are fitted, so as to obtain the roll angle $\theta_{roll}$. The first intermediate camera coordinate system is a camera coordinate system obtained by correction based on the obtained pitch angle $\theta_{pitch}$.

According to an embodiment, the yaw angle determination submodule 4033 may be configured to project all the pixel points onto an XOZ plane of the camera coordinate system, coordinates after projection being $(X_i, Z_i)$. The points projected onto the XOZ plane may be linearly fitted by least square method to obtain a linear equation, so as to obtain a yaw angle $\theta_{yaw}$. According to other embodiments, the pixel points on the land line may also be projected onto an X'OZ' plane of the first intermediate camera coordinate system, and the projected points are fitted, so as to obtain the yaw angle $\theta_{yaw}$. The first intermediate camera coordinate system is a camera coordinate system obtained by correction based on the obtained pitch angle $\theta_{pitch}$.

Therefore, the camera coordinate system may be corrected based on the camera pose information so as to obtain a vehicle coordinate system.

Orders and manners in which the pose angles are obtained may vary according to different embodiments. According to an embodiment, the pitch angle $\theta_{pitch}$ may be calculated first, the camera coordinate system is corrected by using the pitch angle $\theta_{pitch}$ to obtain a first intermediate coordinate system, and the roll angle and/or the yaw angle are/is calculated under the first intermediate coordinate system. However, the changes in any case do not exceed the protection scope of the present disclosure.

Figure 5:
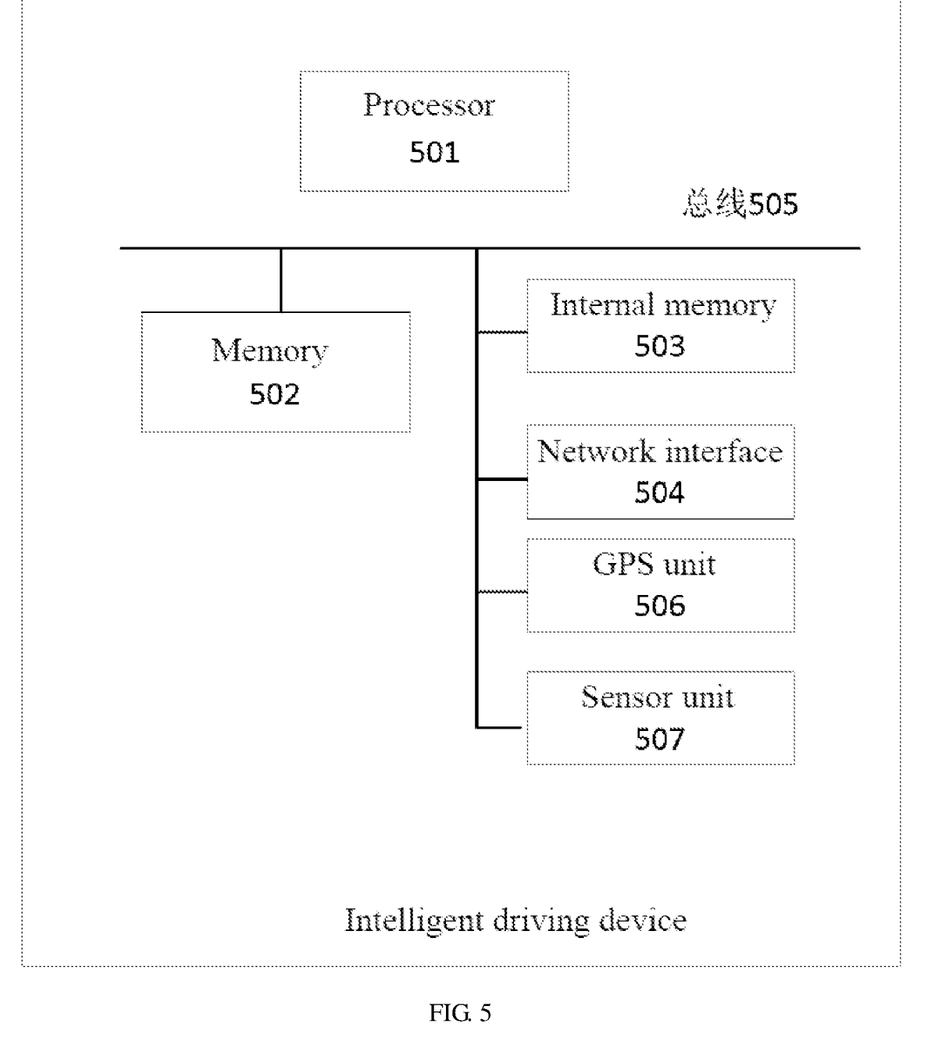
FIG. 5 is a schematic structural diagram of an intelligent driving device according to an embodiment of the present disclosure.

FIG. 5 is a schematic structural diagram of an intelligent driving device according to an embodiment of the present disclosure. The intelligent driving device includes a processor 501 and a memory 502 configured to store a computer program capable of running on the processor 501. The processor 501 is configured to perform steps of the method according to any one of the embodiments of the present disclosure when running the computer program. Here, it does not mean that one processor 501 and one memory 502 are provided, but means that one or more processors 501 and one or more memories 502 may be provided. The intelligent driving device may also include an internal memory 503, a network interface 504, and a system bus 505 connecting the internal memory 503, the network interface 504, the processor 501 and the memory 502. An operating system and a data processing apparatus according to the embodiment of the present disclosure are stored in the memory. The processor 501 is configured to support operations of the entire intelligent driving device. The internal memory 503 may be configured to provide an environment for running the computer program in the memory 502. The network interface 504 may be configured for network communication between an external server device, a terminal device and the like, and configured to receive or transmit data, such as acquire a driving control instruction inputted by a user. The intelligent driving device may also include a GPS unit 506 configured to acquire information about a location of the driving device. A sensor unit 507 may include a dual-lens or multi-lens camera configured to acquire a plurality of images and cooperate with the processor 501 and the memory 502 to obtain depth maps. The processor 501 is configured to perform the method shown in FIG. 1 based on information acquired by each unit, so as to obtain camera pose information.

An embodiment of the present disclosure further provides a computer storage medium, for example, including a memory storing a computer program. The computer program may be executed by a processor, so as to complete steps of the camera pose information detection method according to any one of the embodiments of the present disclosure. The computer storage medium may be a memory such as an FRAM, a ROM, a PROM, an EPROM, an EEPROM, a Flash Memory, a magnetic surface memory, an optical disc, or a CD-ROM; or may be any device including any one of the memories or any combination thereof.

The above embodiments only describe several implementations of the present disclosure, which are described specifically and in detail, and therefore cannot be construed as a limitation on the patent scope of the present disclosure. It should be pointed out that those of ordinary skill in the art may also make several changes and improvements without departing from the ideas of the present disclosure, all of which fall within the protection scope of the present disclosure. Therefore, the patent protection scope of the present disclosure shall be subject to the appended claims.

The invention claimed is:

1. A camera pose information detection method, the method being implemented by a processor to execute a computer program stored on a memory, and comprising:
   collecting a plurality of images by means of a multi-lens camera, and determining a road surface region image based on the plurality of images; and
   projecting points in the road surface region image onto a coordinate plane of a camera coordinate system, so as to obtain at least a pitch angle and/or a roll angle in camera pose information;
   the determining a road surface region image based on the plurality of images comprises:
   selecting one of the plurality of images as an original image, and generating a depth map of the original image in combination with other images in the plurality of images;

traversing the original image by using a search box, and obtaining a plurality of subimages corresponding to various search boxes; and calculating road surface confidences of the subimages, and selecting the subimage with the maximum road surface confidence as the road surface region image.

2. The camera pose information detection method according to claim 1, further comprising:

acquiring points on a lane line, and projecting the points on the lane line onto the coordinate plane of the camera coordinate system, so as to obtain at least a yaw angle in the camera pose information.

3. The camera pose information detection method according to claim 1, wherein the projecting points in the road surface region image onto a coordinate plane of a camera coordinate system to obtain camera pose information, or the projecting the points on the lane line onto the coordinate plane of the camera coordinate system to obtain the camera pose information comprises:

fitting the projected points in the coordinate plane where the points are located, and obtaining the camera pose information based on an angle formed by a fitted line and a coordinate axis of the coordinate plane.

4. An intelligent driving device, comprising:

a processor, and a memory and a network interface that are coupled to the processor;

a vehicle sensor comprising a multi-lens camera configured to acquire a plurality of images;

wherein the processor is configured to perform the method according to claim 1.

5. The camera pose information detection method according to claim 1, wherein the determining a road surface region image based on the plurality of images further comprises:

filtering the plurality of images based on a preset depth threshold, and retaining only the subimages with center point depth values less than the depth threshold; and calculating road surface confidences for the retained subimages, and taking the subimage with the highest confidence as the road surface region image.

6. The camera pose information detection method according to claim 5, wherein the depth threshold ranges at least from 15 m to 25 m.

7. The camera pose information detection method according to claim 1, wherein the calculating road surface confidences of the subimages comprises:

calculating information entropies of the subimages by using the following formula, and taking reciprocals of the information entropies as the road surface confidences, $$E = -\sum_{g=0}^{2^m-1} p(g)\log_2(p(g))$$

where E is an image information entropy, g represents a grayscale value, P(g) is a probability of appearance of a current grayscale value g in the subimage, and m is a natural number greater than or equal to 1.

8. The camera pose information detection method according to claim 1, wherein the traversing the original image by using a search box comprises: determining dimensions of the search box according to the following formulas:

a width of the search box being $W_s = \lceil W/(n*\delta) \rceil$,
a height of the search box being $H_s = \lceil H/n \rceil$;

where W is a width of the original image, H is a height of the original image, $\delta$ is an aspect ratio W/H of the original image, $\lceil \ \rceil$ is a rounding-up symbol, n is a search ratio parameter, and n is a natural number.

9. A camera pose detection apparatus, comprising:

a processor and a memory storing a computer program, wherein when the computer program is executed by the processor, the computer program causes the processor to:

obtain a plurality of images;

determine a road surface region image based on the plurality of images; and determine at least a pitch angle and/or a roll angle in camera pose information based on projections of points in the road surface region image onto a coordinate plane of a camera coordinate system;

wherein when the computer program is executed by the processor, the computer program further causes the processor to select one of the plurality of images as an original image, and generate a depth map of the original image in combination with other images in the plurality of images;

wherein the processor is further caused to:

traverse the original image by using a search box, and obtain a plurality of subimages corresponding to various search boxes; and calculate road surface confidences of the subimages, and select the subimage with the maximum road surface confidence as the road surface region image.

10. The camera pose detection apparatus according to claim 9, wherein when the computer program is executed by the processor, the computer program further causes the processor to acquire pixel points on a lane line and determine at least a yaw angle in the camera pose information based on projections of the pixel points on the lane line onto the coordinate plane of the camera coordinate system.

11. The camera pose detection apparatus according to claim 9, wherein when the computer program is executed by the processor, the computer program further causes the processor to fit the points in the road surface region image or the points on the lane line, which are projected onto the coordinate plane of the camera coordinate system, in the corresponding coordinate plane, and obtain the camera pose information based on an angle formed by a fitted line and a coordinate axis of the coordinate plane.

12. The camera pose detection apparatus according to claim 9, wherein when the computer program is executed by the processor, the computer program further causes the processor to:

filter the plurality of images based on a preset depth threshold, and retain only the subimages with center point depth values less than the depth threshold; and calculate road surface confidences of the retained subimages, and select the subimage with the maximum road surface confidence as the road surface region image.

13. The camera pose detection apparatus according to claim 12, wherein the depth threshold ranges at least from 15 m to 25 m.

14. The camera pose detection apparatus according to claim 9, wherein when the computer program is executed by the processor, the computer program further causes the processor to calculate information entropies of the subimages by using the following formula, and take reciprocals of the information entropies as the road surface confidences, $$E = -\sum_{g=0}^{2^m-1} p(g)\log_2(p(g))$$

where E is an image information entropy, g represents a grayscale value, P(g) is a probability of appearance of a current grayscale value g in the subimage, and m is a natural number greater than 1.

15. The camera pose detection apparatus according to claim 9, wherein when the computer program is executed by the processor, the computer program further causes the processor to determine dimensions of the search box according to the following formulas:
a width of the search box being $W_s = \lceil W/(n*\delta) \rceil$,
a height of the search box being $H_s = \lceil H/n \rceil$;
where W is a width of the original image, H is a height of the original image, δ is an aspect ratio W/H of the original image, ⌈ ⌉ is a rounding-up symbol, n is a search ratio parameter, and n is a natural number.

* * * * *